United States Patent
Srivastava et al.

(10) Patent No.: US 7,627,559 B2
(45) Date of Patent: Dec. 1, 2009

(54) CONTEXT-BASED KEY PHRASE DISCOVERY AND SIMILARITY MEASUREMENT UTILIZING SEARCH ENGINE QUERY LOGS

(75) Inventors: Abhinai Srivastava, Redmond, WA (US); Lee Wang, Kirkland, WA (US); Ying Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 537 days.

(21) Appl. No.: 11/300,919

(22) Filed: Dec. 15, 2005

(65) Prior Publication Data

US 2007/0143278 A1    Jun. 21, 2007

(51) Int. Cl.
*G06F 17/30* (2006.01)
(52) U.S. Cl. .................................. 707/3; 707/4; 707/6
(58) Field of Classification Search ................ 707/3, 707/4, 5, 6, 10, 101, 102
See application file for complete search history.

(56) References Cited

U.S. PATENT DOCUMENTS

| | | | |
|---|---|---|---|
| 5,404,507 A | 4/1995 | Bohm | |
| 5,634,084 A | 5/1997 | Malsheen | |
| 6,212,517 B1 | 4/2001 | Sato et al. | |
| 6,385,629 B1 | 5/2002 | Sundaresan | |
| 6,446,068 B1 | 9/2002 | Kortge | |
| 6,463,428 B1 | 10/2002 | Lee et al. | |
| 6,701,309 B1 | 3/2004 | Beeferman | |
| 6,738,780 B2 | 5/2004 | Lawrence | |
| 6,785,671 B1 * | 8/2004 | Bailey et al. | 707/3 |
| 6,816,857 B1 | 11/2004 | Weissman | |
| 6,963,867 B2 * | 11/2005 | Ford et al. | 707/3 |
| 7,092,936 B1 * | 8/2006 | Alonso et al. | 707/3 |
| 7,117,144 B2 | 10/2006 | Goodman | |
| 7,225,184 B2 | 5/2007 | Carrasco | |
| 7,236,923 B1 | 6/2007 | Gupta | |
| 7,240,049 B2 | 7/2007 | Kapur | |
| 7,293,018 B2 | 11/2007 | Hattori | |
| 7,385,591 B2 | 6/2008 | Goodman | |
| 7,395,259 B2 * | 7/2008 | Bailey et al. | 707/3 |

(Continued)

FOREIGN PATENT DOCUMENTS

WO    WO2005065401    7/2005

OTHER PUBLICATIONS

Derwent 2007-445730.*

(Continued)

*Primary Examiner*—Jean M Corrielus
(74) *Attorney, Agent, or Firm*—Shook, Hardy & Bacon, LLP

(57) ABSTRACT

Usage context obtained from search query logs is leveraged to facilitate in discovery and/or similarity determination of key search phrases. A key phrase extraction process extracts key phrases from raw search query logs and breaks individual queries into a vector of the key phrases. A Similarity Graph generation process then generates a Similarity Graph from the output of the key phrase extraction process. Information relating to the similarity levels between two key phrases can be employed to restrict a search space for tasks such as, for example, online keyword auctions and the like. Thus, instances can be employed to find frequent misspellings of a given keyword, keyword/acronym pairs, key phrases with similar intention, and/or keywords which are semantically related and the like.

15 Claims, 12 Drawing Sheets

U.S. PATENT DOCUMENTS

| | | | |
|---|---|---|---|
| 7,430,561 B2* | 9/2008 | Bailey et al. | 707/101 |
| 7,502,783 B2* | 3/2009 | Palmon et al. | 707/3 |
| 2002/0152064 A1 | 10/2002 | Dutta | |
| 2003/0055816 A1 | 3/2003 | Paine | |
| 2003/0088525 A1 | 5/2003 | Velez et al. | |
| 2004/0024752 A1 | 2/2004 | Manber | |
| 2004/0088241 A1 | 5/2004 | Rebane et al. | |
| 2004/0181525 A1 | 9/2004 | Itzhak | |
| 2004/0220944 A1 | 11/2004 | Behrens | |
| 2004/0225647 A1* | 11/2004 | Connelly et al. | 707/3 |
| 2004/0236736 A1* | 11/2004 | Whitman et al. | 707/3 |
| 2004/0243568 A1* | 12/2004 | Wang et al. | 707/3 |
| 2005/0033771 A1 | 2/2005 | Schmitter | |
| 2005/0038894 A1 | 2/2005 | Hsu et al. | |
| 2005/0060306 A1 | 3/2005 | Hattori | |
| 2005/0071325 A1 | 3/2005 | Bem | |
| 2005/0102259 A1 | 5/2005 | Kapur | |
| 2005/0114319 A1 | 5/2005 | Brent et al. | |
| 2005/0137939 A1 | 6/2005 | Calabria et al. | |
| 2005/0165769 A1 | 7/2005 | Yoshida et al. | |
| 2005/0228797 A1 | 10/2005 | Koningstein | |
| 2005/0267872 A1 | 12/2005 | Galai | |
| 2006/0004892 A1 | 1/2006 | Lunt | |
| 2006/0074870 A1 | 4/2006 | Brill | |
| 2006/0155751 A1 | 7/2006 | Geshwind | |
| 2006/0200340 A1 | 9/2006 | Fontenelle | |
| 2006/0224583 A1 | 10/2006 | Fikes | |
| 2006/0253423 A1 | 11/2006 | McLane | |
| 2006/0287988 A1 | 12/2006 | Mason | |
| 2006/0288100 A1 | 12/2006 | Carson | |
| 2007/0038602 A1 | 2/2007 | Weyand | |
| 2007/0038621 A1 | 2/2007 | Weyand | |
| 2007/0067267 A1 | 3/2007 | Ives | |
| 2007/0100993 A1 | 5/2007 | Malhotra | |
| 2007/0118394 A1 | 5/2007 | Cahoon | |
| 2007/0198506 A1 | 8/2007 | Rezaei | |
| 2007/0226198 A1 | 9/2007 | Kapur | |
| 2008/0040329 A1 | 2/2008 | Cussen | |

OTHER PUBLICATIONS

SVD Subspace Projections for Term Suggestion Ranking and Clustering; Introduction http://research.yahoo.com/publication/YRL-2004-023.pdf.

Google Adwords https://adwords.google.com/support/bin/answer.py?answer=6100&hl=en_US.

Global Promoter; Finding Keywords with Global Promoter's Free Keyword Generator Tool Keyword Suggestion Tool: Finding Keywords the Easy Way http://www.globalpromoter.com/seo-tools/keyword-suggestion-tool.cfm.

Wordtracker Keywords; Effective Search Engine Optimization Depends on Choosing the Best Keywords http://www.wordtracker.com/tell-me-more.html.

non-Final Office Action for U.S. Appl. No. 11/403,955. Mail Date May 13, 2008.

Final Office Action for U.S. Appl. No. 11/403,955. Mail Date Nov. 26, 2008.

non-Final Office Action for U.S. Appl. No. 11/403,955. Mail Date Jun. 8, 2009.

Leah S. Larkey et al., "Acrophile: an Automated Acronym Extractor and Server", Proceedings of the fifth ACM conference on Digital libraries, San Antonio, Texas, pp. 205-214, 2000.

Chih Lee Et Al., "Identifying Relevant Full-Text Articles for GO Annotation without McSH Terms", Proceedings of the 13th Text Retrieval Conference, NIST Special Publication, 500-261, Nov. 16-19, 2004.

International Search Report dated Aug. 17, 2007.

non-Final Office Action for U.S. Appl. No. 11/378,280. Mail Date May 12, 2008.

Final Office Action for U.S. Appl. No. 11/378,280. Mail Date Jan. 30, 2009.

* cited by examiner

CONTEXT-BASED KEY PHRASE DISCOVERY AND SIMILARITY MEASUREMENT UTILIZING SEARCH ENGINE QUERY LOGS

BACKGROUND

Advertising in general is a key revenue source in just about any commercial market or setting. To reach as many consumers as possible, advertisements are traditionally presented via billboards, television, radio, and print media such as newspapers and magazines. However, with the Internet, advertisers have found a new and perhaps less expensive medium for reaching vast numbers of potential customers across a large and diverse geographic span. Advertisements on the Internet can primarily be seen on web pages or web sites as well as in pop-up windows when a particular site is visited.

The Internet provides users with a mechanism for obtaining information regarding any suitable subject matter. For example, various web sites are dedicated to posting text, images, and video relating to world, national, and local news. A user with knowledge of a uniform resource locator (URL) associated with one of such web sites can simply enter the URL into a web browser to be provided with the web site and access content. Another conventional manner of locating desired information from the Internet is through utilization of a search engine. For instance, a user can enter a word or series of words into a search field and initiate a search (e.g., through depression of a button, one or more keystrokes, voice commands, etc.). The search engine then utilizes search algorithms to locate web sites related to the word or series of words entered by the user into the search field, and the user can then select one of the web sites returned by the search engine to review related content.

Oftentimes, users who are searching for information will see related advertisements and click on such advertisements to purchase products, thereby creating business for that particular retailer. Furthermore, the search engine is provided with additional revenue by selling advertisement space for a period of time to a retailer when a relevant term, such as, for example, the term "doggie," is utilized as a search term. Thus, an individual who enters the term "doggie" into a search engine may be interested in purchasing items related to dogs—thus, it is beneficial for a company that sells pet items to advertise to that user at the point in time that the user is searching for a relevant term.

Conventionally, advertising space relating to search terms provided to a search engine is bought or sold in an auction manner. More specifically, a search engine can receive a query (from a user) that includes one or more search terms that are of interest to a plurality of buyers. The buyers can place bids with respect to at least one of the search terms, and a buyer that corresponds to the highest bid will have their advertisement displayed upon a resulting page view. Bidding and selection of a bid can occur within a matter of milliseconds, thereby not adversely affecting usability of the search engine. Thus, two or more competing bidders can bid against one another within a limited time frame until a sale price of advertising space associated with one or more search terms in the received query is determined. This bidding is often accomplished by way of proxies (e.g., computer component) that are programmed with a demand curve for specific search term(s). As alluded to above, auctioning advertising space associated with search terms is a substantial source of revenue for search engines, and can further be a source of revenue for advertisers.

Because of the potential of a significant boost in revenue from advertising with search terms, it is very likely that a business will associate as many search terms and variations as possible to their advertisements. For example, an advertiser of pet items might submit a list of terms and variations for "doggie," such as "dog," "dogs," and "doggy." The intent of the advertiser is to select all terms and variations that would likely be used by users during a search. However, these lists of terms are often manually composed and frequently omit terms/variations that might increase sales for the advertiser. As an example, sometimes different spellings of words become popular that would not normally be included in the lists such as "dogz" or "doggee." Automatically finding these terms and including them in associated advertising terms could substantially improve sales for the advertiser and revenue for a search engine provider.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to online searching, and more particularly to systems and methods for discovering and/or determining similarity of search key phrases. Usage context obtained from search query logs is leveraged to facilitate in discovery and/or similarity determination of key search phrases. A key phrase extraction process extracts key phrases from raw search query logs and breaks individual queries into a vector of the key phrases. A Similarity Graph generation process then generates a Similarity Graph from the output of the key phrase extraction process. Information relating to the similarity levels between two key phrases can be employed to restrict a search space for tasks such as, for example, online keyword auctions and the like. Thus, instances can be employed to find frequent misspellings of a given keyword, keyword/acronym pairs, key phrases with similar intention, and/or keywords which are semantically related and the like.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
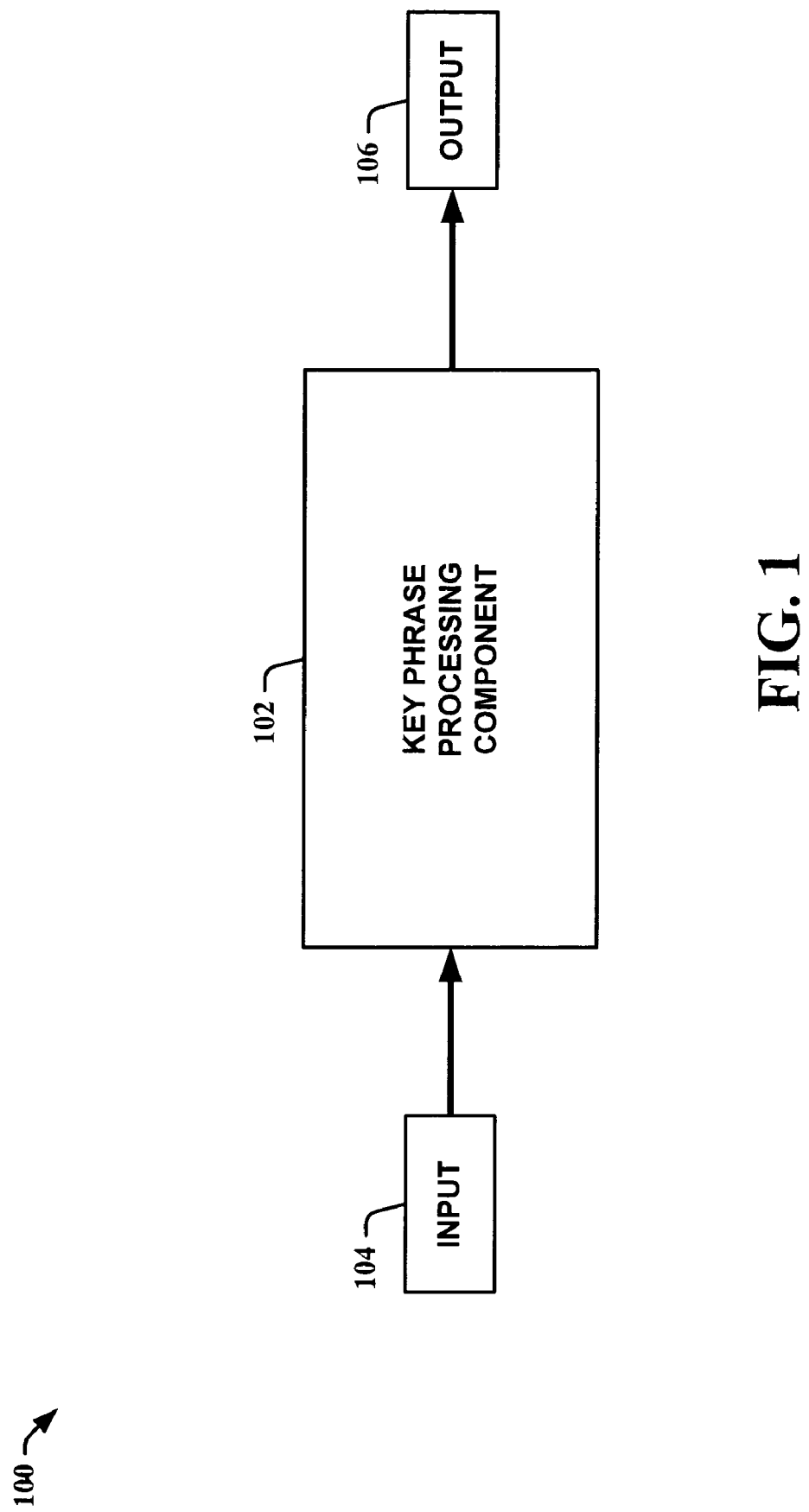
FIG. 1 is a block diagram of a key phrase processing system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

During the process of bidding for a keyword in online keyword auction systems for search engines, advertisers have to supply a long list of mutations for the same keyword to maximize their reach while retaining relevance. Absence of a system that automatically makes such recommendations forces the advertisers to supply such a list manually. This is both cumbersome and inefficient. Since the advertiser has no direct way of knowing the relative frequency of various possible keyword mutations, it is highly likely that they miss out on some of the important mutations. Instances of the systems and methods herein discover key phrases and/or measure their similarity by utilizing the usage context information from search engine query logs. The information of similarity levels between two key phrases can then be used to narrow down the search space of several tasks in online keyword auctions, like finding all the frequent misspellings of a given keyword, finding the keyword/acronym pairs, finding key phrases with similar intention, and/or finding keywords which are semantically related and the like.

In FIG. 1, a block diagram of a key phrase processing system 100 in accordance with an aspect of an embodiment is shown. The key phrase processing system 100 is comprised of a key phrase processing component 102 that receives an input 104 and provides an output 106. The input 104 is generally comprised of search query log information. This type of data is typically compiled when users search for things of interest on a network such as the Internet and/or an intranet. The logs can contain search terms and/or other information associated with a search such as, for example, time when the search was executed, number of hits, and/or user identification and the like. The key phrase processing component 102 utilizes textual strings of queries in the logs to provide the output 106. A number of "hits" or times the search query was entered can also be utilized by the key phrase processing component 102. The output 106 can be comprised of, for example, a key phrase list, query breakup data and/or a Similarity Graph (described infra) and the like. Thus, the key phrase processing component 102 can be employed to facilitate in extracting key phrases and/or determine similarities between the key phrases based on the input 104. Similarities between key phrases can be utilized in applications such as, for example, advertising systems where an association of one search key term to another can be invaluable.

Figure 2:
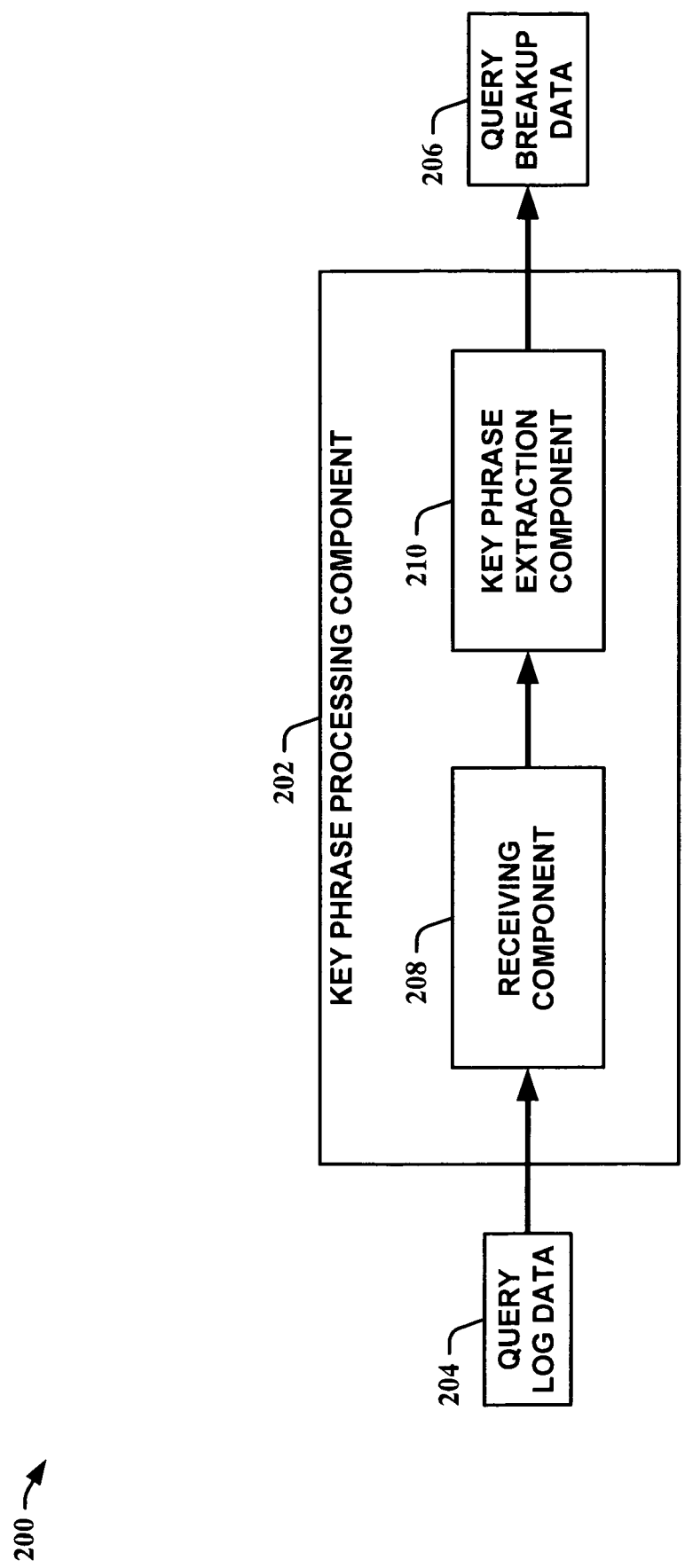
FIG. 2 is another block diagram of a key phrase processing system in accordance with an aspect of an embodiment.

Looking at FIG. 2, another block diagram of a key phrase processing system 200 in accordance with an aspect of an embodiment is depicted. The key phrase processing system 200 is comprised of a key phrase processing component 202 that receives query log data 204 and provides query breakup data 206. In other instances a key phrase list can also be provided (not illustrated). The key phrase processing component 202 is comprised of a receiving component 208 and a key phrase extraction component 210. The receiving component 208 obtains query log data 204 from a network associated data source such as, for example, a local network (e.g., intranet) data source and/or a global network (e.g., the Internet) data source and the like. The receiving component 208 can also provide basic pre-filtering of the raw data from the query log data 204 if required by the key phrase extraction component 210. For example, the receiving component 208 can re-format data and/or filter data based on a particular time period, a particular network source, a particular location, and/or a particular amount of users and the like. The receiving component 208 can also be co-located with a data source. The key phrase extraction component 210 receives the query log data 204 from the receiving component 208 and extracts key phrases. The extraction process is described in detail infra. The key phrase extraction component 210 can also directly receive the query log data 204 for processing. The extracted key phrases are then utilized to provide the query breakup data 206. The query breakup data 206 is typically a data file that is employed to determine Similarity Graphs (see infra) for the extracted key phrases.

Figure 3:
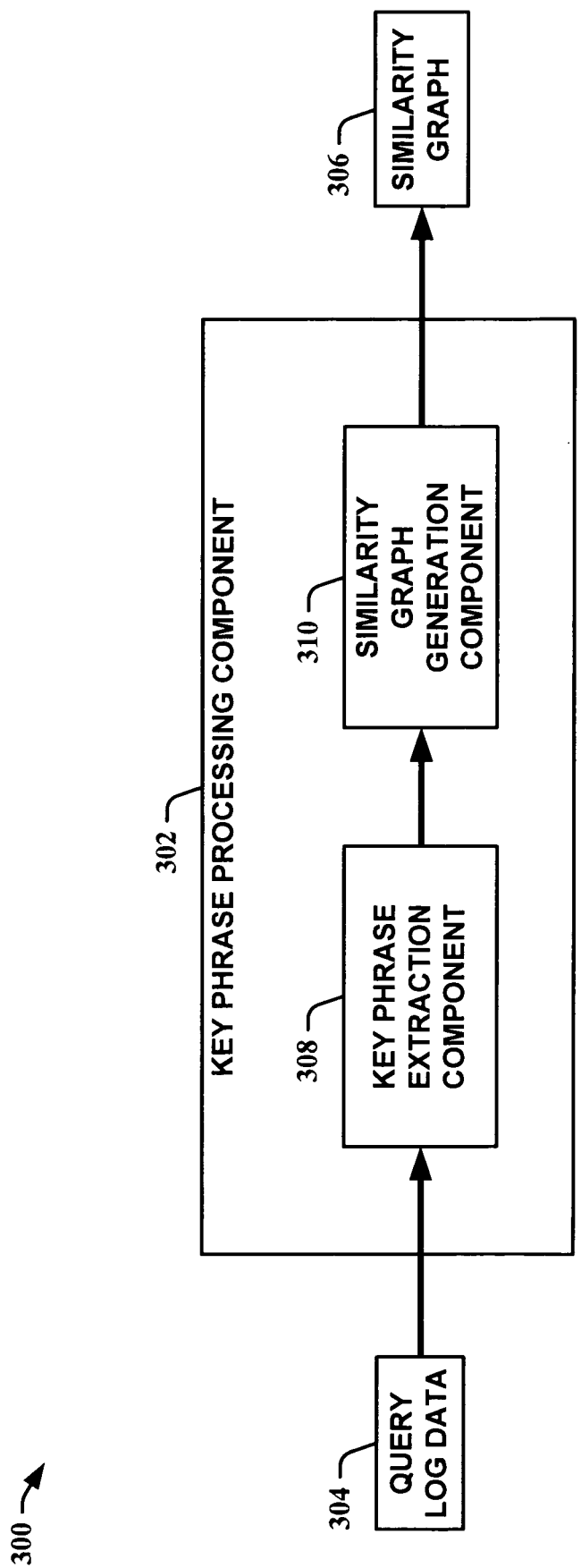
FIG. 3 is yet another block diagram of a key phrase processing system in accordance with an aspect of an embodiment.

Turning to FIG. 3, yet another block diagram of a key phrase processing system 300 in accordance with an aspect of an embodiment is illustrated. The key phrase processing system 300 is comprised of a key phrase processing component 302 that receives query log data 304 and provides Similarity Graph 306. The key phrase processing component 302 is comprised of a key phrase extraction component 308 and a Similarity Graph generation component 310. The key phrase extraction component 308 obtains query log data 304 from a network associated data source such as, for example, a local network data source and/or a global network data source and the like. The key phrase extraction component 308 extracts key phrases from the query log data 304. The extracted key phrases are then utilized to provide query breakup data to the Similarity Graph generation component 310. The Similarity Graph generation component 310 processes the query breakup data to generate the Similarity Graph 306. Similarity Graph generation is described in detail infra.

Figure 4:
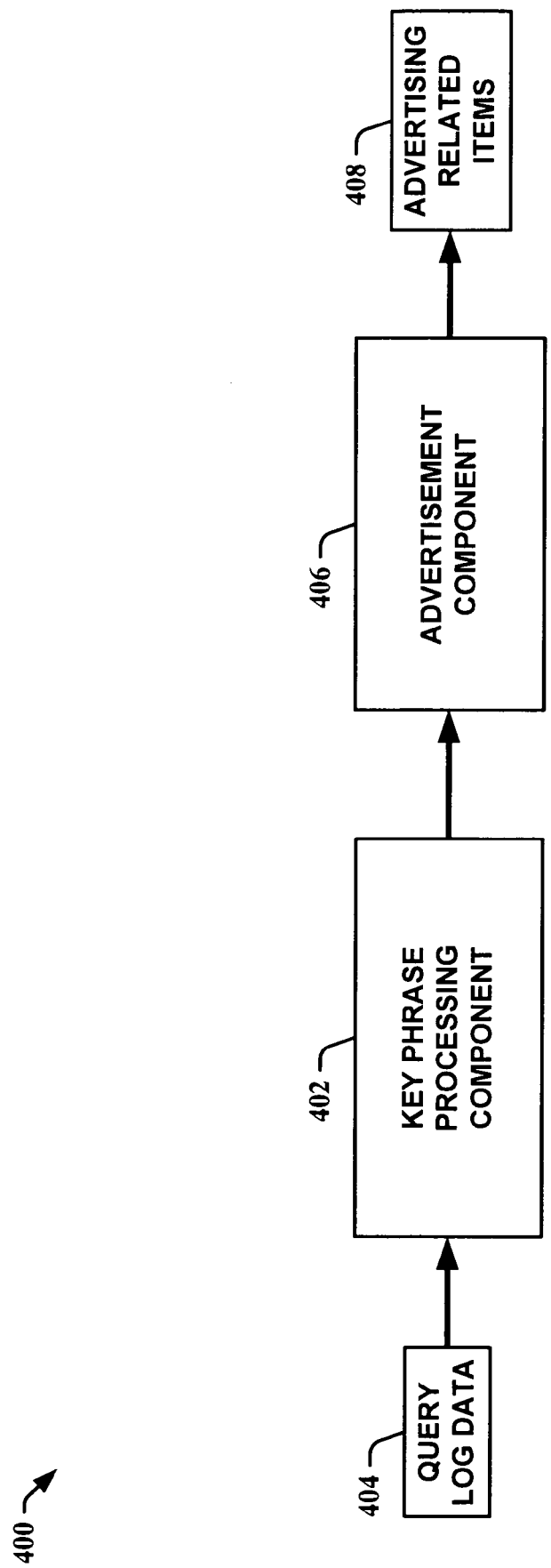
FIG. 4 is a block diagram of a key phrase processing system utilized with an advertising component in accordance with an aspect of an embodiment.

Moving on to FIG. 4, a block diagram of a key phrase processing system 400 utilized with an advertising component 406 in accordance with an aspect of an embodiment is shown. The key phrase processing system 400 is comprised of a key phrase processing component 402 that receives query log data 404 and interacts with advertisement component 406 which provides advertising related items 408 for advertisers. In this instance, the key phrase processing component 402 generates a Similarity Graph from the query log data 404 and provides this to the advertisement component 406. This allows the advertisement component 406 to generate advertising related items 408. The advertising related items 408 can include, for example, frequent misspellings of a given keyword, keyword/acronym pairs, key phrases with similar intention, and/or keywords which are semantically related and the like. This substantially increases the performance of the advertisement component 406 and facilitates in automatically generating terms for advertisers, eliminating the need to manually track related advertising search terms.

This is contrary to the current process of bidding for a keyword in the online keyword auction systems for search engines in which advertisers have to supply a long list of mutations for the same keyword to maximize their reach while retaining relevance. Various kinds of mutations are: (1) Misspells/Multiple spellings—for example, an advertiser targeting users who searched for "britney spears" must bid for the most common spellings of the name such as, for example, "britney spears", "brittany spears", etc.; (2) Acronyms—for example, advertisers targeting keyword "hewlett packard" must also bid on "hp."; (3) Similar intention—for example, advertisers selling cheap air tickets must bid on "cheap air tickets," "cheap air fares," "cheap airlines," "discount fares" and so on; and (4) Related keywords—for example, advertisers selling pet supplies must bid for "cats," "dogs," "rottweiler" and so on.

Presently, absence of a process that automatically makes such recommendations forces the advertisers to supply such a list manually. This is both cumbersome and inefficient. Since the advertiser has no direct way of knowing the relative frequency of various possible keyword mutations, it is highly likely that they miss out on some of the important mutations. This manual and often incomplete provision of such keyword lists results in loss of customers for the advertiser and loss of revenues for search engines.

While (3) and (4) above can only be solved by employing instances of the systems and methods herein (to determine the similarity of key phrases in a document corpus such as search engine query logs), there exists algorithms which can solve (1) and (2) without using a similarity measure. However, the computational complexity associated with using such algorithms over the scope of entire query logs is computationally burdensome. Instances of the systems and methods herein can provide a mechanism for determining similarity between key phrases using usage context information (e.g., information apart from a focus term of a search) in search query logs. Thus, key phrases can be found which have a similar intention and/or are related conceptually by looking at the similarity of key phrase patterns around them. Moreover, the scope of applying existing algorithms for solving (1) and (2) above can be substantially reduced by limiting the search space to only those key phrases which are similar to the given key phrase. This makes the algorithms computationally tractable and also provides higher accuracy for the final results.

First, a process is utilized to discover key phrases that are statistically sound from raw query logs. This facilitates in: (1) breaking down individual queries into a vector of key phrases; (2) removing the associated noise while capturing the usage context of a key phrase in a given query; and (3) capturing the statistically most significant key phrases that are used by users by the common patterns in which they framed search queries. Secondly, a process is utilized to take a list of key phrase segmented queries as input and return a Similarity Graph as output. The Similarity Graph is a graph with the key phrases as its nodes. Two nodes are joined with an edge if similarity between them is greater than a given threshold. The edge weight is represented by the similarity value between two key phrases. This value ranges between "0" and "1." A value of "0" represents completely dissimilar while a value of "1" represents completely similar.

Figure 5:
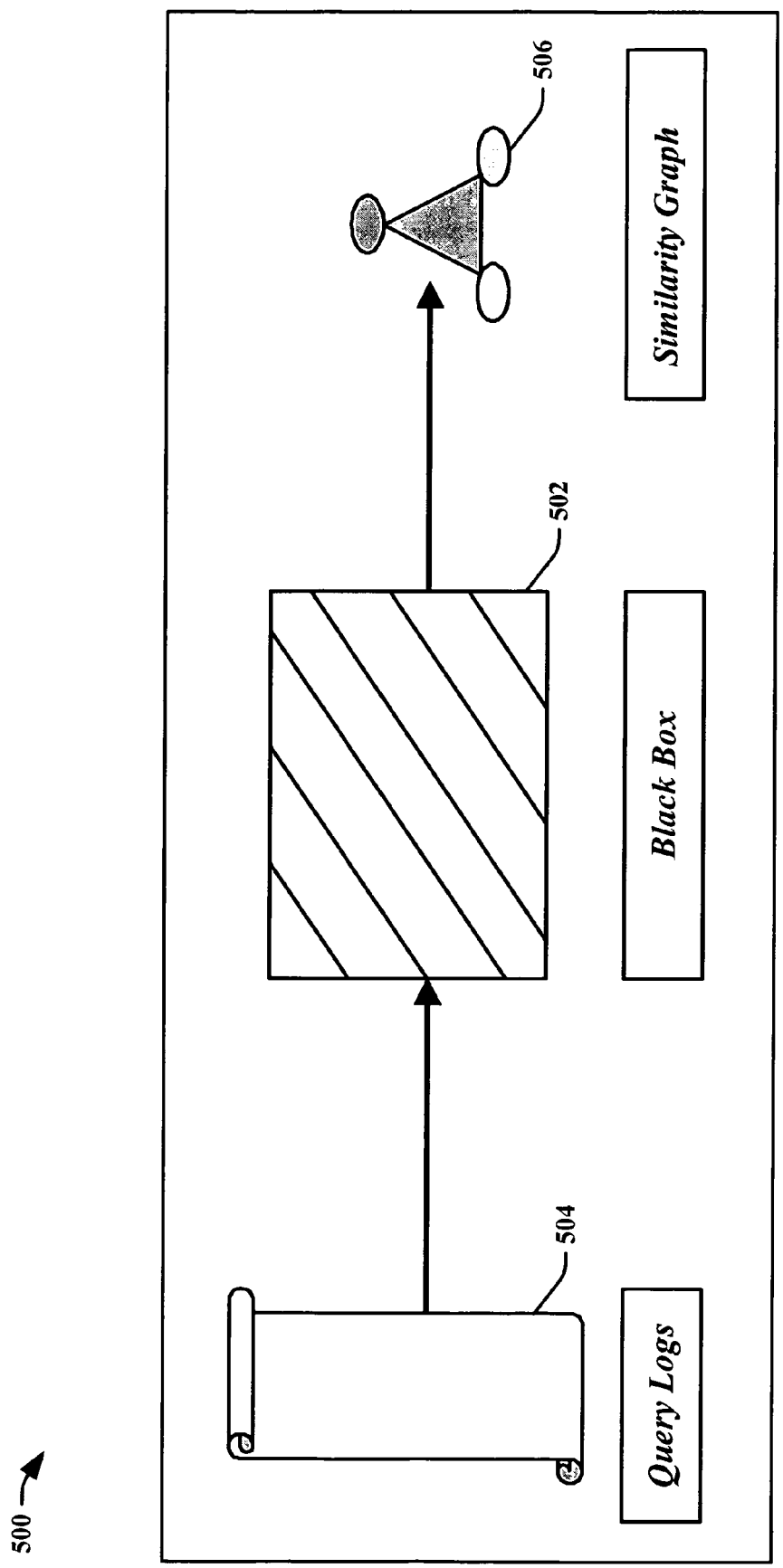
FIG. 5 is an overview example of a key phrase discovery and similarity determination process in accordance with an aspect of an embodiment.

In FIG. 5, an overview example 500 of a key phrase discovery and similarity determination process in accordance with an aspect of an embodiment is illustrated. If a process is treated as a black box 502, an input 504, for example, is a list of queries from raw query logs and an output 506 is a Similarity Graph as described above. An overall process can generally employ, for example, one or both of two processes, namely (1) Key-phrase extraction—a process to extract key phrases from raw logs and break the individual queries into a vector of these key phrases and/or (2) Similarity Graph generation—a process to generate a Similarity Graph from an output of the key phrase extraction process.

Figure 6:
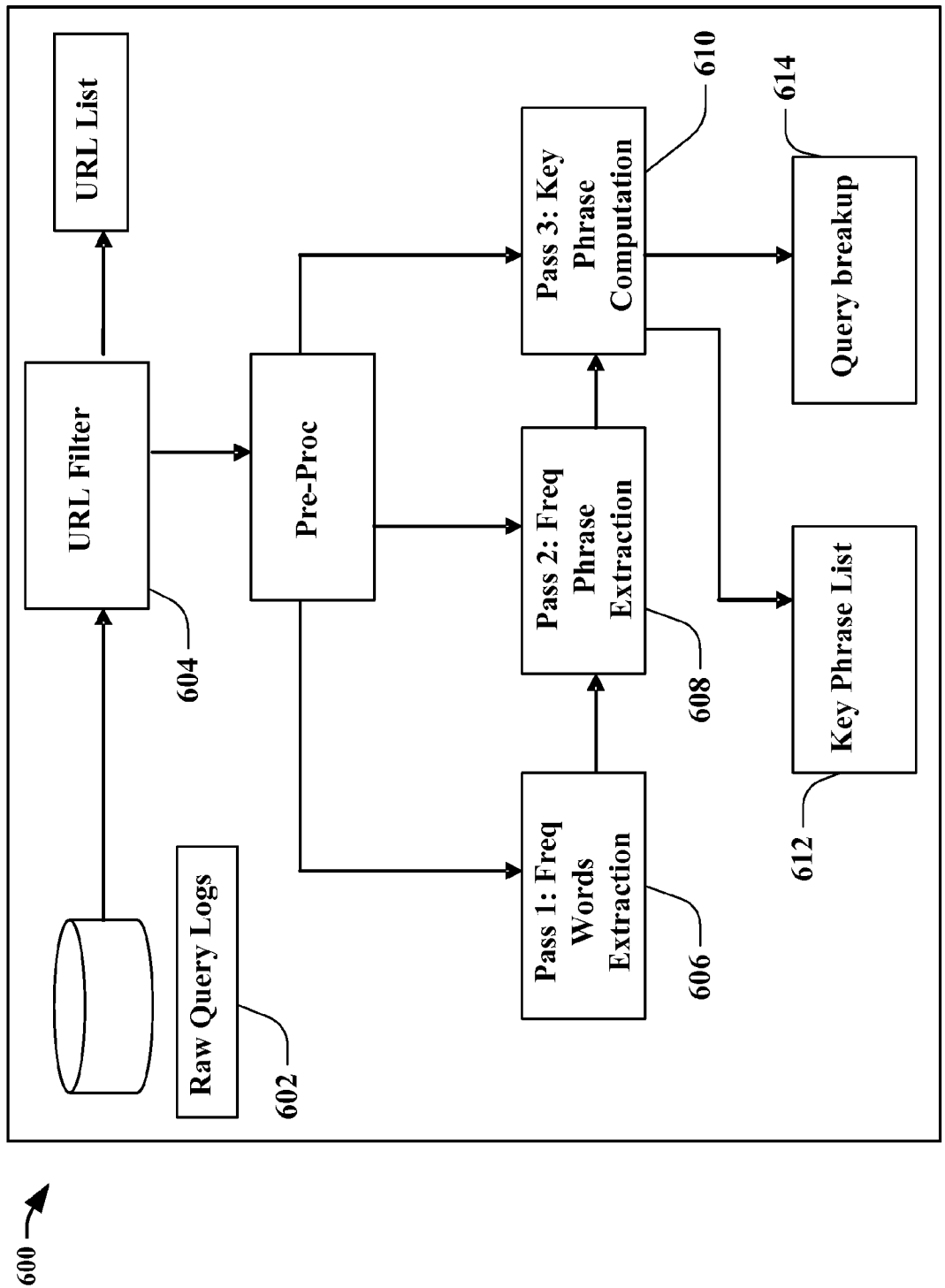
FIG. 6 is an overview example of a key phrase extraction process in accordance with an aspect of an embodiment.

Turning to FIG. 6, an overview example of a key phrase extraction process 600 in accordance with an aspect of an embodiment is shown. The key phrase extraction process 600 is generally comprised of the following passes on search query logs 602:

Noise Filtering: This pass includes, but is not limited to, the following: First, the query logs 602 are passed through a URL filter 604 which filters out queries which happen to be a URL. This step is important for noise reduction because roughly 15% of search engine logs are URLs. Second, non-alphanumeric characters, except punctuation marks, are omitted from the queries. Third, queries containing valid patterns of punctuation marks like ".", ",", "?" and quotes and the like are broken down into multiple parts at the boundary of punctuation.

Low-frequency word filtering 606: In this pass, frequencies of individual words that occur in the entire query logs are determined. At the end of this pass, words which have a frequency lower than a pre-set threshold limit are discarded. This pass eliminates the generation of phrases containing infrequent words in the next step. Typically, if a word is infrequent then a phrase which contains this word is likely infrequent as well.

Key-phrase candidate generation 608: In this pass, possible phrases up-to a pre-set length of N words for each query is generated, where N is an integer from one to infinity. Typically, a phrase which contains an infrequent word, a stop-word at the beginning, a stop-word at the end, and/or a phrase that appears in a pre-compiled list of non-standalone key phrases are not generated. At the end of the pass, frequencies of phrases are counted and infrequent phrases are discarded. The remaining list of frequent phrases is called a "key phrase candidate list."

Key-phrase determination 610: For each query, the best break is estimated by a scoring function which assigns a score of a break as sum of $(n-1) \times frequency + 1$ of each constituent key phrase. Here, n is a number of words in the given key phrase and can be an integer from one to infinity. Once the best break is determined, a real count of each constituent key phrase of the best query break is incremented by 1. This pass outputs a query breakup 614 in a file for later use to generate a Co-occurrence Graph 702.

One can make an additional pass through the list of key phrases 612 generated in the above step and discard the key phrases with a real frequency below a certain threshold when the count of obtained key phrases exceeds the maximum that is needed.

Figure 7:
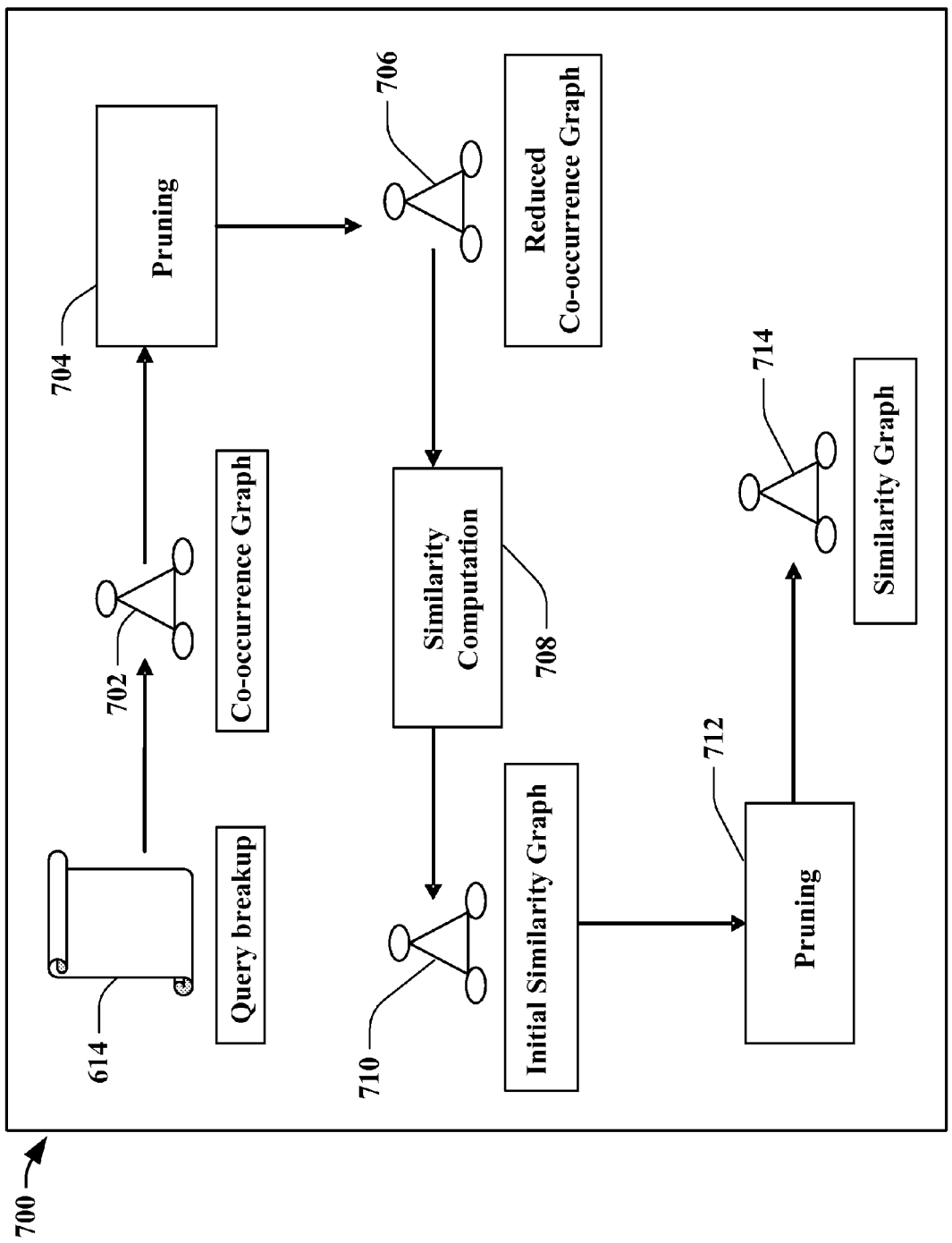
FIG. 7 is an overview example of a Similarity Graph generation process in accordance with an aspect of an embodiment.

Looking at FIG. 7, an overview example of a Similarity Graph generation process 700 in accordance with an aspect of an embodiment is depicted. The Similarity Graph generation process 700 is typically comprised of the following:

Co-occurrence Graph generation: Using the query breakup file 614 generated in a key phrase extraction process 600, a key phrase Co-occurrence Graph 702 is generated. A Co-occurrence Graph 702 is a graph with key phrases as nodes and edge weights representing the number of times two key phrases are part of the same query. For example, if a breakup of a query had three key phrases, namely, a, b, and c then the weights of the following edges are incremented by 1: {a,b}, {a,c} and {b,c}.

Co-occurrence Graph pruning 704: Once the Co-occurrence Graph 702 has been generated, noise is removed by pruning edges with a weight less than a certain threshold. Next, nodes which have less than a certain threshold number of edges are pruned. Edges associated with these nodes are also removed. Further, the top K edges for each node are determined, where K is an integer from one to infinity. Edges, except those falling into the top K of at least 1 node, are then removed from the graph.

Similarity Graph creation: A new graph called the Similarity Graph 710 is then created. The set of nodes of this graph is the key phrases which remain as nodes in the Co-occurrence Graph 706 after Co-occurrence Graph pruning 704.

Similarity Graph edge computation 708: For each pair {$n_1$, $n_2$} of nodes in the Similarity Graph 710, an edge {$n_1$, $n_2$} is created if and only if the similarity value $S(n_1,n_2)$ for the two nodes in the Co-occurrence Graph 706 is greater than a threshold T. The weight of the edge {$n_1$, $n_2$} is $S(n_1,n_2)$. The similarity value $S(n_1,n_2)$ is defined as the cosine distance between the vectors {$e_1 n_1$, $e_2 n_1$ ... } and {$e_1 n_2$, $e_2 n_2$ ... }, where $e_1 n_1$, $e_2 n_1$ ... are the edges connecting node $n_1$ in the Co-occurrence Graph 706 and $e_1 n_2$, $e_2 n_2$ ... are the edges connecting node $n_2$ in the Co-occurrence Graph 706. Cosine distance between two vectors $V_1$ and $V_2$ is computed as follows: $(V_1 \cdot V_2)/|V_1| X |V_2|$. A total of $\sim nC_2$ distance computations are required at this stage.

Similarity Graph edge pruning 712: The top E edges by edge weight for each node in the Similarity Graph 710 are then determined, where E is an integer from one to infinity. The edges, except those falling in the top E edges of at least one node, are removed. Typically, the value of E is approximately 100.

Output: Output the generated Similarity Graph 714 generated above.

The Similarity Graph 714 can be stored in a hash table data structure for very quick lookups of key phrases that have a similar usage context as the given key phrase. The keys of such a hash table are the key phrases and the values are a list of key phrases which are neighbors of the hash key in the Similarity Graph 714. The main parameter to control the size of this graph is the minimum threshold value for frequent key phrases in the key phrase extraction process 600. The size of the Similarity Graph 714 is roughly directly proportional to the coverage of key phrases. Hence, this parameter can be adjusted to suit a given application and/or circumstances.

Figure 8:
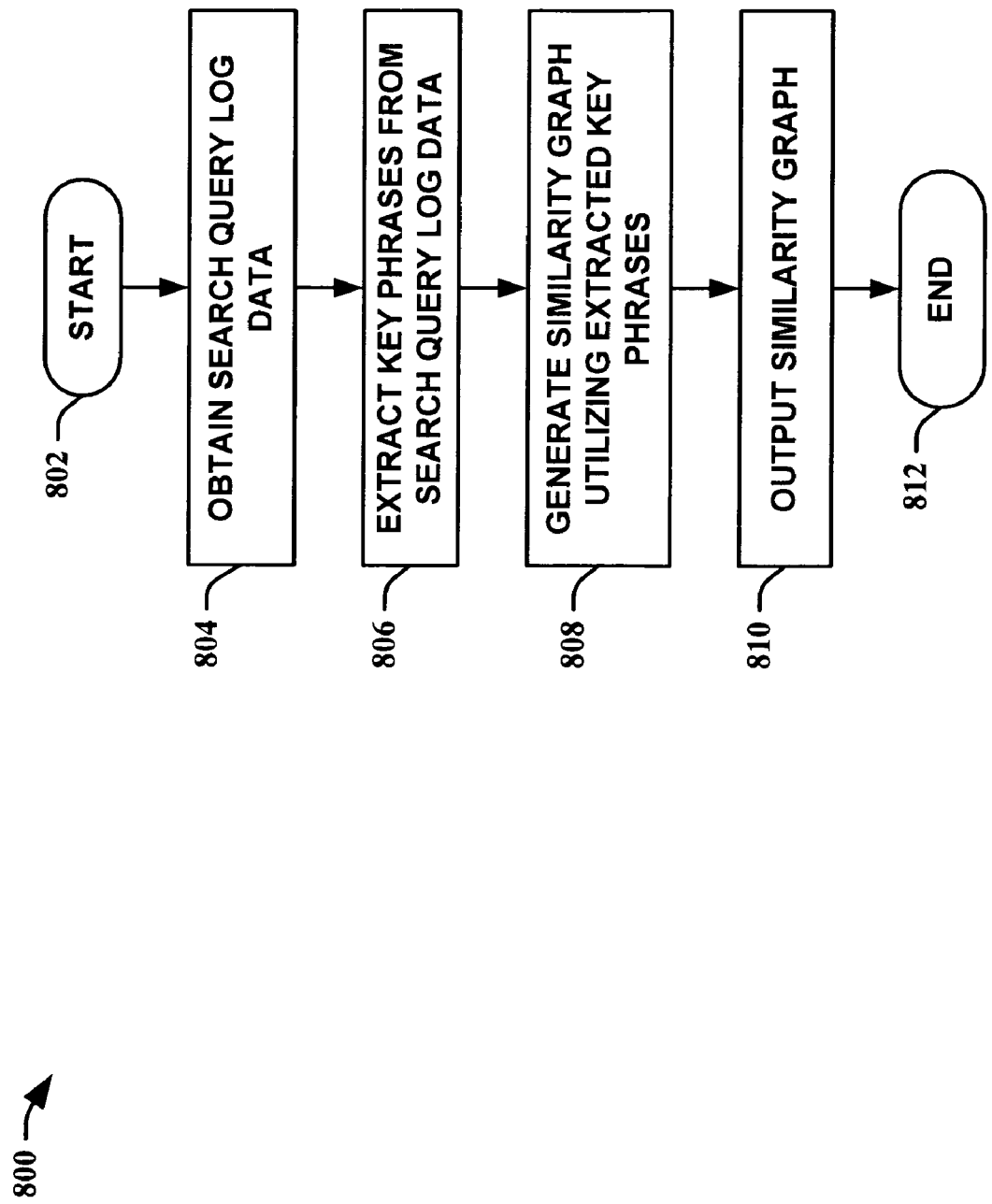
FIG. 8 is a flow diagram of a method of facilitating key phrase discovery and similarity determination in accordance with an aspect of an embodiment.
Figure 9:
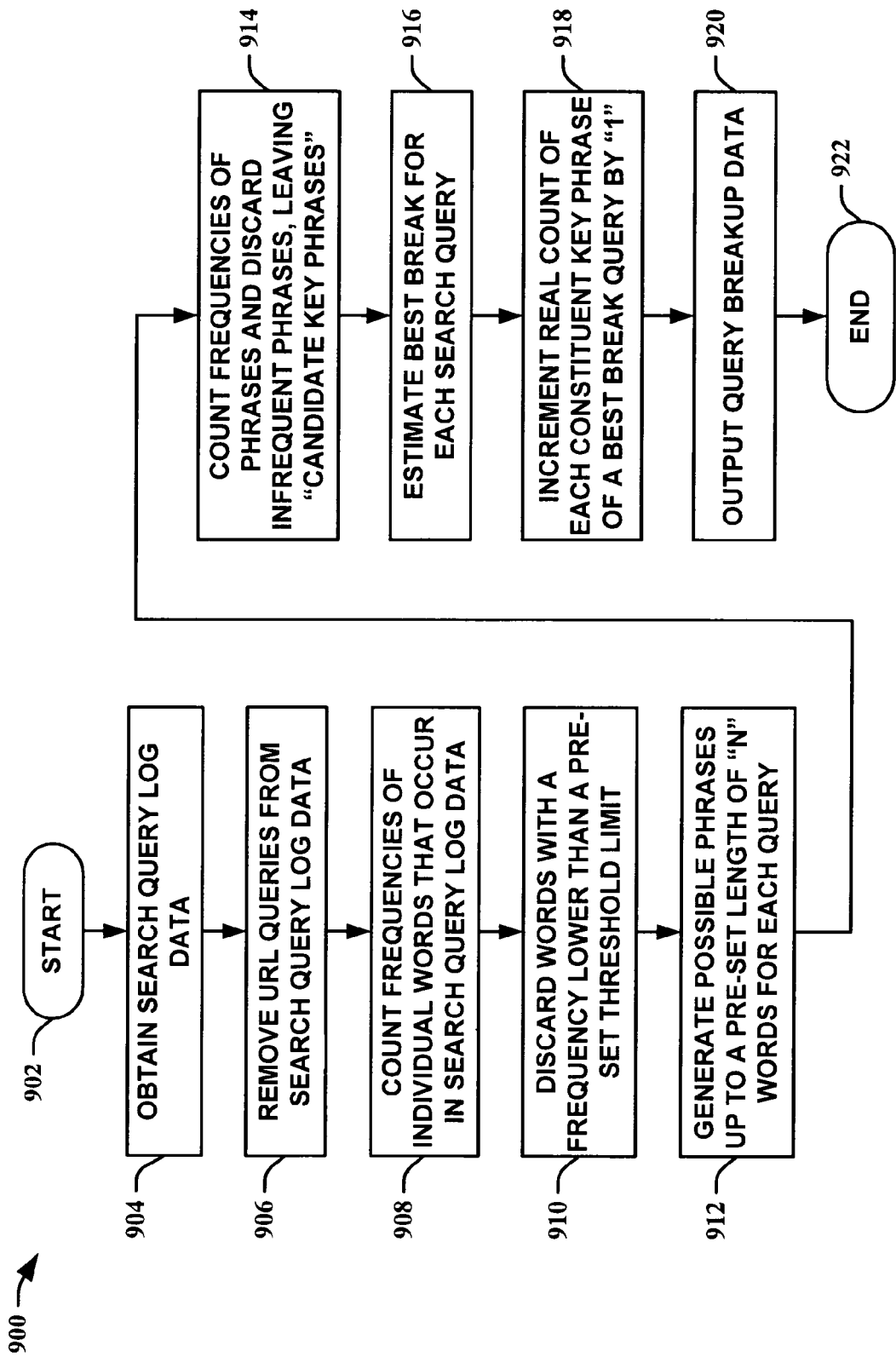
FIG. 9 is a flow diagram of a method of facilitating key phrase discovery in accordance with an aspect of an embodiment.
Figure 10:
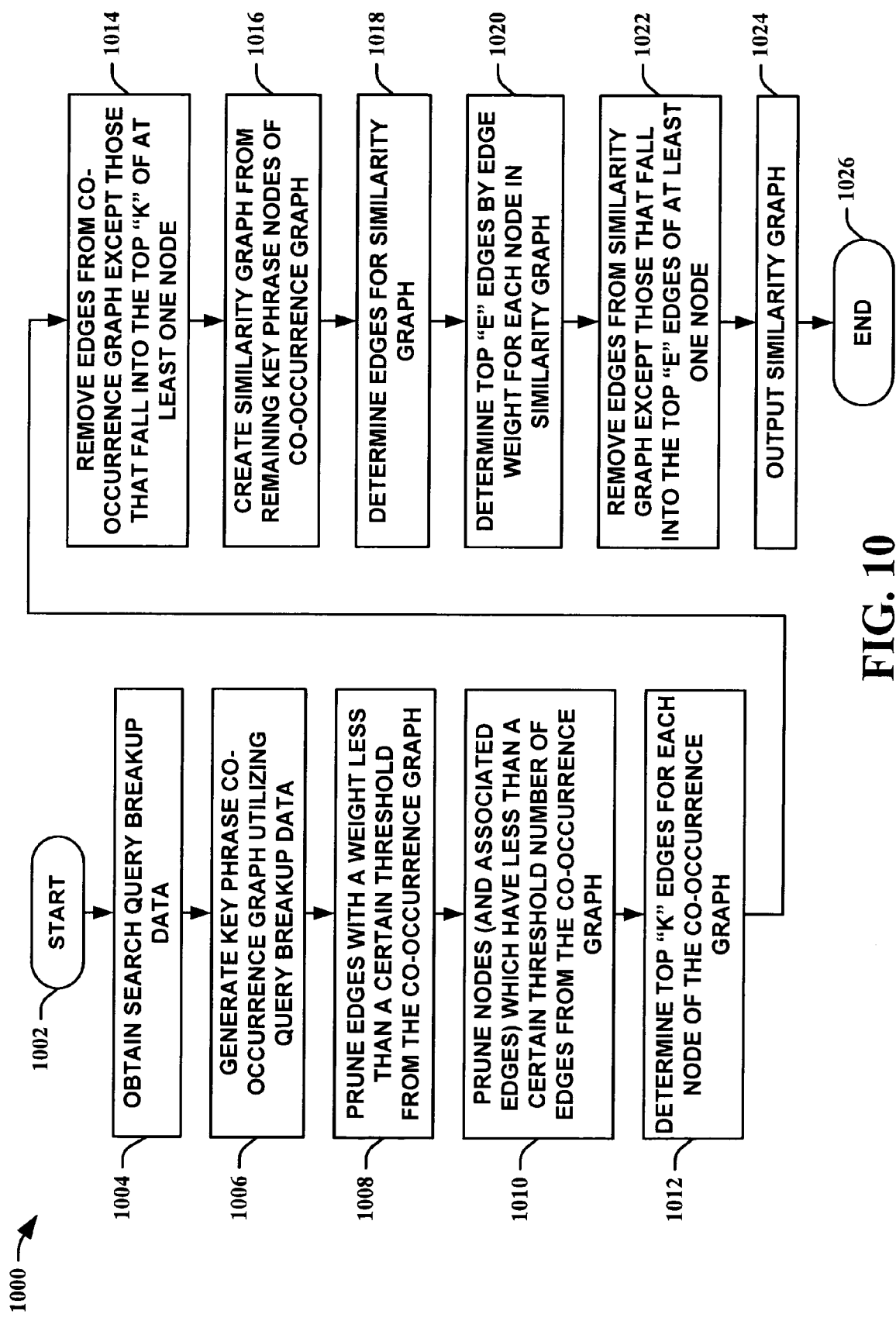
FIG. 10 is a flow diagram of a method of facilitating key phrase similarity determination in accordance with an aspect of an embodiment.

In view of the exemplary systems shown and described above, methodologies that may be implemented in accordance with the embodiments will be better appreciated with reference to the flow charts of FIGS. 8-10. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

In FIG. 8, a flow diagram of a method 800 of facilitating key phrase discovery and similarity determination in accordance with an aspect of an embodiment is shown. The method 800 starts 802 by obtaining search query log data 804. This type of data is typically compiled when users search for things of interest on a network such as the Internet and/or an intranet. The logs can contain search terms and/or other information associated with a search such as, for example, time when the search was executed, number of hits, and/or user identification and the like. Key phrases from the search query log data are then extracted 806. The extraction processes that can be employed are described in detail infra and supra. A Similarity Graph is then generated utilizing the extracted key phrases 808. The Similarity Graph is then output 810 for utilization with applications that require key phrase similarity information, ending the flow 812. Similarities between key phrases can be utilized in applications such as, for example, advertising systems where an association of one search key term to another can be invaluable and/or other applications noted supra and the like. Similarity Graphs can be stored as hash tables to reduce their size and facilitate in real-time processes.

Looking at FIG. 9, a flow diagram of a method 900 of facilitating key phrase discovery in accordance with an aspect of an embodiment is depicted. The method 900 starts 902 by obtaining search query log data 904. The logs can contain search terms and/or other information associated with a search such as, for example, time when the search was executed, number of hits, and/or user identification and the like. URL queries are then removed from the search query log data 906. The query logs are typically passed through a URL filter which filters out queries which happen to be a URL. In other instances, additional filtering can occur such as, for example, removal of non-alphanumeric characters, except punctuation marks. Queries containing valid patterns of punctuation marks like "." "," "?" and quotes and the like can also be broken down into multiple parts at a boundary of punctuation.

Frequencies of individual words that occur in the search query log data are then counted 908. Words with a frequency lower than a pre-set threshold limit are discarded 910. This eliminates the generation of key phrases containing infrequent words. Typically, if a word is infrequent then a phrase which contains this word is likely infrequent as well. Possible phrases up to a pre-set length of "N" words are generated for each query 912, where "N" is an integer from one to infinity. Generally, a phrase which contains an infrequent word, a stop-word at the beginning, a stop-word at the end, and/or a phrase that appears in a pre-compiled list of non-standalone key phrases is not generated.

Frequencies of phrases are counted and infrequent phrases are discarded, leaving "candidate key phrases" 914. A best break for each search query is then estimated 916. For example, for each query, the best break can be estimated by a scoring function which assigns a score of a break as sum of (n−1)×frequency+1 of each constituent key phrase. Here, n is a number of words in the given key phrase and can be a number from one to infinity. A real count of each constituent key phrase of a best break query is then incremented by "1" 918. Query breakup data is then output 920 to facilitate in applications that utilize query breakup information such as, for example, a Co-occurrence Graph employed in constructing Similarity Graphs and the like, ending the flow 922.

Turning to FIG. 10, a flow diagram of a method 1000 of facilitating key phrase similarity determination in accordance with an aspect of an embodiment is illustrated. The method 1000 starts 1002 by obtaining search query breakup data 1004. A key phrase Co-occurrence Graph is then generated utilizing query breakup data 1006. The Co-occurrence Graph has key phrases as nodes and edge weights representing the number of times two key phrases are part of the same query. For example, if a breakup of a query had three key phrases, namely, a, b, and c then the weights of the following edges are incremented by 1: {a,b}, {a,c} and {b,c}. Edges with a weight less than a certain threshold are pruned from the Co-occurrence Graph 1008. Nodes (and associated edges) which have less than a certain threshold number of edges are also pruned from the Co-occurrence Graph 1010.

Top K edges for each node of the Co-occurrence Graph are then determined 1012, where K is an integer from one to infinity. Edges are removed from the Co-occurrence Graph except those that fall into the top K of at least one node 1014. A Similarity Graph is then created from the remaining key phrase nodes of the Co-occurrence Graph 1016. The set of nodes of this graph is the key phrases which remain as nodes in the Co-occurrence Graph after Co-occurrence Graph pruning. Edges for the Similarity Graph are then determined 1018. For each pair $\{n_1, n_2\}$ of nodes in the Similarity Graph, an edge $\{n_1, n_2\}$ is created if and only if the similarity value $S(n_1,n_2)$ for the two nodes in the Co-occurrence Graph is greater than a threshold T. The weight of the edge $\{n_1,n_2\}$ is $S(n_1,n_2)$. The similarity value $S(n_1,n_2)$ is defined as the cosine distance between the vectors $\{e_1n_1, e_2n_1 \ldots\}$ and $\{e_1n_2, e_2n_2 \ldots\}$, where $e_1n_1, e_2n_1 \ldots$ are the edges connecting node $n_1$ in the Co-occurrence Graph and $e_1n_2, e_2n_2 \ldots$ are the edges connecting node $n_2$ in the Co-occurrence Graph. Cosine distance between two vectors $V_1$ and $V_2$ is computed as follows: $(V_1 \cdot V_2)/|V_1||V_2|$. A total of $\sim nC_2$ distance computations are required at this stage.

Top E edges are then determined by edge weight for each node in the Similarity Graph 1020, where E is an integer from one to infinity. Edges from the Similarity Graph are then removed, except those that fall into the top E edges of at least one node 1022. For example, the value of E can be approximately 100. The Similarity Graph is then output 1024 to facilitate applications that utilize key phrase similarities such as keyword advertising auctions and the like, ending the flow 1026.

Figure 11:
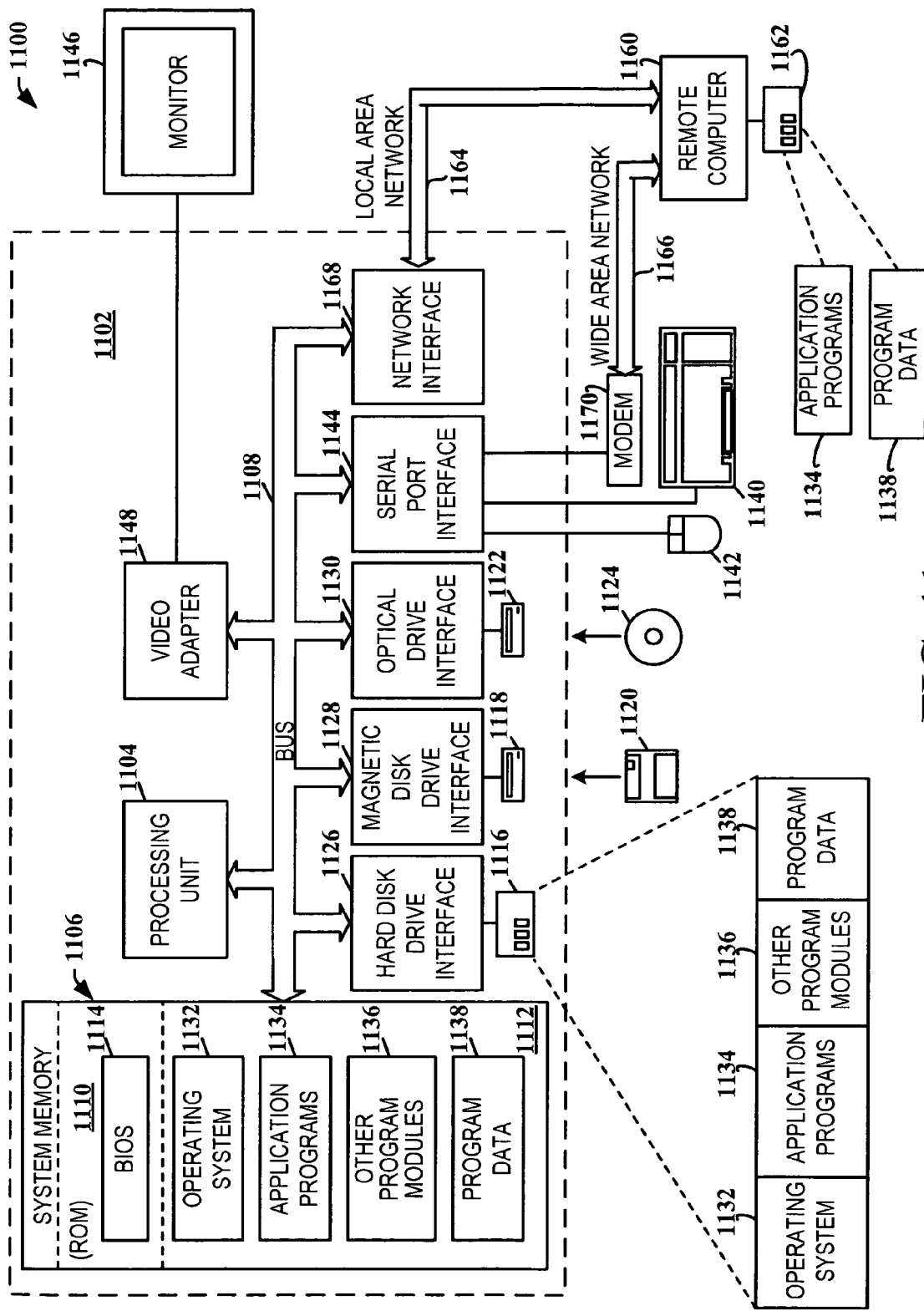
FIG. 11 illustrates an example operating environment in which an embodiment can function.

In order to provide additional context for implementing various aspects of the embodiments, FIG. 11 and the following discussion is intended to provide a brief, general description of a suitable computing environment 1100 in which the various aspects of the embodiments can be performed. While the embodiments have been described above in the general context of computer-executable instructions of a computer program that runs on a local computer and/or remote computer, those skilled in the art will recognize that the embodiments can also be performed in combination with other program modules. Generally, program modules include routines, programs, components, data structures, etc., that perform particular tasks and/or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based and/or programmable consumer electronics, and the like, each of which can operatively communicate with one or more associated devices. The illustrated aspects of the embodiments can also be practiced in distributed computing environments where certain tasks are performed by remote processing devices that are linked through a communications network. However, some, if not all, aspects of the embodiments can be practiced on stand-alone computers. In a distributed computing environment, program modules can be located in local and/or remote memory storage devices.

With reference to FIG. 11, an exemplary system environment 1100 for performing the various aspects of the embodiments include a conventional computer 1102, including a processing unit 1104, a system memory 1106, and a system bus 1108 that couples various system components, including the system memory, to the processing unit 1104. The processing unit 1104 can be any commercially available or proprietary processor. In addition, the processing unit can be implemented as multi-processor formed of more than one processor, such as can be connected in parallel.

The system bus 1108 can be any of several types of bus structure including a memory bus or memory controller, a peripheral bus, and a local bus using any of a variety of conventional bus architectures such as PCI, VESA, Microchannel, ISA, and EISA, to name a few. The system memory 1106 includes read only memory (ROM) 1110 and random access memory (RAM) 1112. A basic input/output system (BIOS) 1114, containing the basic routines that help to transfer information between elements within the computer 1102, such as during start-up, is stored in ROM 1110.

The computer 1102 also can include, for example, a hard disk drive 1116, a magnetic disk drive 1118, e.g., to read from or write to a removable disk 1120, and an optical disk drive 1122, e.g., for reading from or writing to a CD-ROM disk 1124 or other optical media. The hard disk drive 1116, magnetic disk drive 1118, and optical disk drive 1122 are connected to the system bus 1108 by a hard disk drive interface 1126, a magnetic disk drive interface 1128, and an optical drive interface 1130, respectively. The drives 1116-1122 and their associated computer-readable media provide nonvolatile storage of data, data structures, computer-executable instructions, etc. for the computer 1102. Although the description of computer-readable media above refers to a hard disk, a removable magnetic disk and a CD, it should be appreciated by those skilled in the art that other types of media which are readable by a computer, such as magnetic cassettes, flash memory, digital video disks, Bernoulli cartridges, and the like, can also be used in the exemplary operating environment 1100, and further that any such media can contain computer-executable instructions for performing the methods of the embodiments.

A number of program modules can be stored in the drives 1116-1122 and RAM 1112, including an operating system 1132, one or more application programs 1134, other program modules 1136, and program data 1138. The operating system 1132 can be any suitable operating system or combination of operating systems. By way of example, the application programs 1134 and program modules 1136 can include a key phrase processing scheme in accordance with an aspect of an embodiment.

A user can enter commands and information into the computer 1102 through one or more user input devices, such as a keyboard 1140 and a pointing device (e.g., a mouse 1142). Other input devices (not shown) can include a microphone, a joystick, a game pad, a satellite dish, a wireless remote, a scanner, or the like. These and other input devices are often connected to the processing unit 1104 through a serial port interface 1144 that is coupled to the system bus 1108, but can be connected by other interfaces, such as a parallel port, a game port or a universal serial bus (USB). A monitor 1146 or other type of display device is also connected to the system bus 1108 via an interface, such as a video adapter 1148. In addition to the monitor 1146, the computer 1102 can include other peripheral output devices (not shown), such as speakers, printers, etc.

It is to be appreciated that the computer 1102 can operate in a networked environment using logical connections to one or more remote computers 1160. The remote computer 1160 can be a workstation, a server computer, a router, a peer device or other common network node, and typically includes many or all of the elements described relative to the computer 1102, although for purposes of brevity, only a memory storage device 1162 is illustrated in FIG. 11. The logical connections depicted in FIG. 11 can include a local area network (LAN) 1164 and a wide area network (WAN) 1166. Such networking environments are commonplace in offices, enterprise-wide computer networks, intranets and the Internet.

When used in a LAN networking environment, for example, the computer 1102 is connected to the local network 1164 through a network interface or adapter 1168. When used in a WAN networking environment, the computer 1102 typically includes a modem (e.g., telephone, DSL, cable, etc.) 1170, or is connected to a communications server on the LAN, or has other means for establishing communications over the WAN 1166, such as the Internet. The modem 1170, which can be internal or external relative to the computer 1102, is connected to the system bus 1108 via the serial port interface 1144. In a networked environment, program modules (including application programs 1134) and/or program data 1138 can be stored in the remote memory storage device 1162. It will be appreciated that the network connections shown are exemplary and other means (e.g., wired or wireless) of establishing a communications link between the computers 1102 and 1160 can be used when carrying out an aspect of an embodiment.

In accordance with the practices of persons skilled in the art of computer programming, the embodiments have been described with reference to acts and symbolic representations of operations that are performed by a computer, such as the computer 1102 or remote computer 1160, unless otherwise indicated. Such acts and operations are sometimes referred to as being computer-executed. It will be appreciated that the acts and symbolically represented operations include the manipulation by the processing unit 1104 of electrical signals representing data bits which causes a resulting transformation or reduction of the electrical signal representation, and the maintenance of data bits at memory locations in the memory system (including the system memory 1106, hard drive 1116, floppy disks 1120, CD-ROM 1124, and remote memory 1162) to thereby reconfigure or otherwise alter the computer system's operation, as well as other processing of signals. The memory locations where such data bits are maintained are physical locations that have particular electrical, magnetic, or optical properties corresponding to the data bits.

Figure 12:
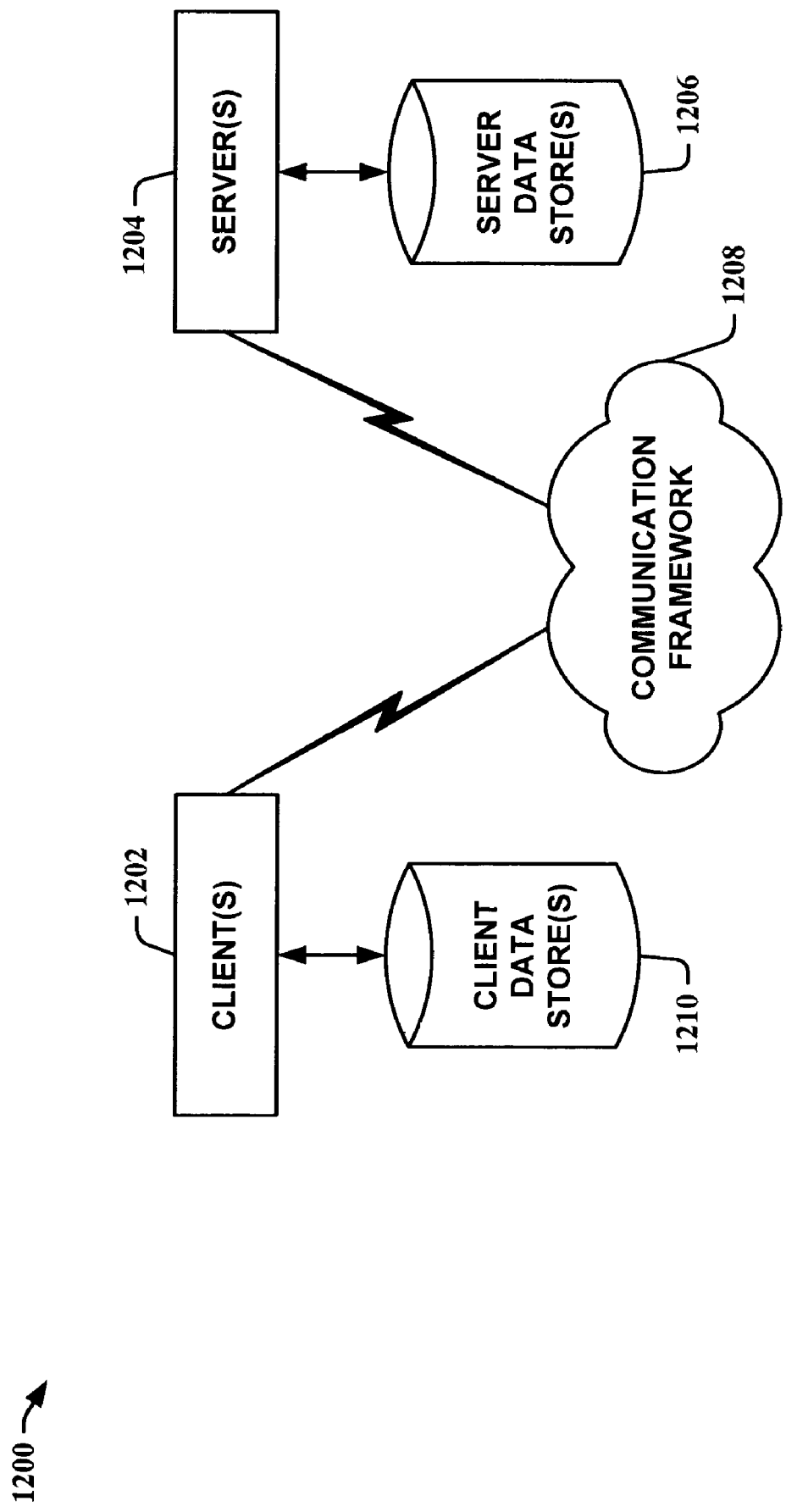
FIG. 12 illustrates another example operating environment in which an embodiment can function.

FIG. 12 is another block diagram of a sample computing environment 1200 with which embodiments can interact. The system 1200 further illustrates a system that includes one or more client(s) 1202. The client(s) 1202 can be hardware and/or software (e.g., threads, processes, computing devices). The system 1200 also includes one or more server(s) 1204. The server(s) 1204 can also be hardware and/or software (e.g., threads, processes, computing devices). One possible communication between a client 1202 and a server 1204 can be in the form of a data packet adapted to be transmitted between two or more computer processes. The system 1200 includes a communication framework 1208 that can be employed to facilitate communications between the client(s) 1202 and the server(s) 1204. The client(s) 1202 are connected to one or more client data store(s) 1210 that can be employed to store information local to the client(s) 1202. Similarly, the server(s) 1204 are connected to one or more server data store(s) 1206 that can be employed to store information local to the server(s) 1204.

It is to be appreciated that the systems and/or methods of the embodiments can be utilized in key phrase processing facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates key phrase processing, comprising:

a memory; and a processor, operatively coupled to the memory, the processor executing computer executable components, comprising:

a component that obtains data from a search query log; and an extraction component configured to:

removing universal resource locator (URL) queries from the search query log data;

extracting key phrases from the search query log data by;

counting frequencies of individual words that occur in the search query log data;

discarding words with a frequency lower than a first pre-set threshold limit;

generating possible phrases up to a pre-set length of n words for each search query, where n is an integer from one to infinity and counting frequencies of phrases;

discarding infrequent phrases to create candidate key phrases;

breaking individual queries into key phrases vectors to provide query breakup information by estimating a best break for each search query and incrementing a real count of each constituent key phrase of a best break search query by one; and providing the query breakup information to facilitate in determining key phrase similarities.

2. The system of claim 1, the extraction component employs noise filtering on the search query log data to remove universal resource locator (URL) search queries.

3. The system of claim 1, the extraction component employs low frequency word filtering to remove low occurrence search words from the search query log data.

4. The system of claim 1, the extraction component determines query breakup information based on, at least in part, a number of words in a key phrase and a frequency associated with the key phrase.

5. The system of claim 1 further comprising: a graph generation component that employs, at least in part, the key phrase vectors from the key phrase extraction component to construct a Similarity Graph that indicates similarity between key phrases.

6. The system of claim 5, the graph generation component provides a Co-occurrence Graph for key phrases by utilizing, at least in part, query breakup information.

7. The system of claim 6, the graph generation component provides a noise filter for the Co-occurrence Graph that, at least in part, prunes edges that are less than a first given threshold and prunes nodes that have less than a second given threshold.

8. The system of claim 7, the graph generation component generates a Similarity Graph, prunes top E edges by edge weight for each node, and removes edges except edges that fall within at least one of the top E edges, where E is an integer from one to infinity.

9. The system of claim 5 further comprising component that generates advertising related items from the Similarity Graph.

10. A method for facilitating key phrase processing, comprising:
employing a processor operatively coupled to memory to execute the key phrase processing, comprising:
obtaining data from at least one search query log;
extracting key phrases from the search query log data; and
breaking individual queries into key phrase vectors to provide query breakup information, the breakup information for each key phrase is based at least in part on a function of the frequency of each key phrase and the number of words in each key phrase;
generating a key phrase Co-occurrence Graph utilizing the query breakup information;
pruning edges with a weight less than a first threshold number from the Co-occurrence Graph;
pruning nodes and the associated edges which have less than a second threshold number of edges from the Co-occurrence Graph;
determining top K edges for each node of the Co-occurrence Graph, where K is an integer from one to infinity;
removing edges from the Co-occurrence Graph except for the edges fall into the top K of at least one node;
creating a Similarity Graph from remaining key phrase nodes of the Co-occurrence Graph;
determining edges for the Similarity Graph; determining top E edges by edge weight for each node in the Similarity Graph, where L is an integer from one to infinity; and
removing edges from the Similarity Graph except those that fall into the top E edges of at least one node; and
outputting the Similarity Graph to facilitate applications that utilize similarities between key phrases.

11. The method of claim 10 further comprising:
removing universal resource locator (URL) search queries from the search query log data to filter noise;
eliminating low occurrence search words from the search query log data to filter out low frequency words; and
generating key phrase candidates that have less than a pre-set length of N words for each query and counting their frequency, where N is an integer from one to infinity.

12. The method of claim 10 the method further comprising generating advertising related items from the Similarity Graph.

13. The method of claim 10 further comprising: converting the Similarity Graph into hash tables to facilitate in employing it in substantially real-time processes.

14. A system that facilitates key phrase processing, comprising:
means for obtaining data from at least one search query log;
means for removing URL queries from search query log data;
means for extracting key phrases from the filtered search query log data, the means for extracting key phrases being configured to:
count frequencies of individual words that occur in the search query log data; and
discard words with a frequency lower than a first pre-set threshold limit;
generate possible phrases up to a pre-set length of n words for each search query, where n is an integer from one to infinity; and
count frequencies of phrases and discarding infrequent phrases to create candidate key phrases;
means for breaking each search query into key phrase vectors, the means for breaking each search query being configured to:
estimate a best break for each search query;
increment a real count of each constituent key phrase of a best break search query by one; and
means for providing the query breakup information to facilitate in determining key phrase similarities.

15. A computer-executed method for facilitating key phrase processing by employing a processor to execute computer executable instructions stored on memory, comprising:
obtaining data from at least one search query log;
removing URL queries from the search query log data;
extracting key phrases from the search query log data by:
counting frequencies of individual words that occur in the search query log data;
discarding words with a frequency lower than a first pre-set threshold limit;
generating possible phrases up to a pre-set length of n words for each search query, where n is an integer from one to infinity and counting frequencies of phrases; and
discarding infrequent phrases to create candidate key phrases;
breaking individual queries into key phrase vectors to provide query breakup information by estimating a best break for each search query and incrementing a real count of each constituent key phrase of a best break search query by one; and
providing the query breakup information to facilitate in determining key phrase similarities.

* * * * *

UNITED STATES PATENT AND TRADEMARK OFFICE
CERTIFICATE OF CORRECTION

PATENT NO. : 7,627,559 B2 Page 1 of 1
APPLICATION NO. : 11/300919
DATED : December 1, 2009
INVENTOR(S) : Srivastava et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 741 days.

Signed and Sealed this

Second Day of November, 2010

David J. Kappos
*Director of the United States Patent and Trademark Office*